United States Patent [19]

Sarin et al.

[11] 4,409,004

[45] Oct. 11, 1983

[54] CARBONITRIDE COATED COMPOSITE SILICON NITRIDE CUTTING TOOLS

[75] Inventors: Vinod K. Sarin, Lexington; Sergej-Tomislav Buljan, Acton; Charles D'Angelo, Southboro, all of Mass.

[73] Assignee: GTE Laboratories Incorporated, Waltham, Mass.

[21] Appl. No.: 380,382

[22] Filed: May 20, 1982

[51] Int. Cl.³ .......................................... B24D 11/00
[52] U.S. Cl. ........................................ 51/295; 51/307; 51/308; 51/309; 427/215; 428/404; 428/698
[58] Field of Search ................. 51/295, 307, 308, 309; 427/215; 428/404, 698

[56] References Cited

U.S. PATENT DOCUMENTS

| | | | |
|---|---|---|---|
| 3,656,995 | 4/1972 | Reedy, Jr. ........................... | 148/16.6 |
| 3,684,585 | 8/1972 | Stroup et al. ...................... | 427/249 |
| 3,854,991 | 12/1974 | Hale ................................... | 428/336 |
| 3,895,923 | 7/1975 | Wakefield ......................... | 428/698 |
| 3,914,473 | 10/1975 | Hale ................................... | 427/255 |
| 4,018,631 | 4/1977 | Hale ................................... | 148/31.5 |
| 4,035,541 | 7/1977 | Smith et al. ....................... | 428/217 |
| 4,101,703 | 7/1978 | Schintlmeister .................. | 428/216 |
| 4,162,338 | 7/1979 | Schintlmeister .................. | 427/249 |
| 4,179,301 | 12/1979 | Buljan ................................ | 501/154 |
| 4,249,913 | 2/1981 | Johnson et al. ................... | 51/295 |
| 4,282,289 | 8/1981 | Kullander et al. ................ | 428/457 |
| 4,357,382 | 11/1982 | Lambert et al. ................... | 428/212 |

FOREIGN PATENT DOCUMENTS 1388261  7/1978  United Kingdom .

Primary Examiner—Donald E. Czaja
Assistant Examiner—W. Thompson
Attorney, Agent, or Firm—Jerry F. Janssen; Ivan L. Ericson

[57] ABSTRACT

Cutting tools and cutting tool inserts having improved mechanical and chemical wear resistance under demanding conditions of machining speed, temperature, or workpiece hardness comprise a composite silicon nitride substrate having at least one hard adherent coating layer of a refractory metal carbonitride. The composite silicon nitride substrate body consists essentially of particles of a refractory material uniformly distributed in a matrix consisting essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof.

16 Claims, 1 Drawing Figure

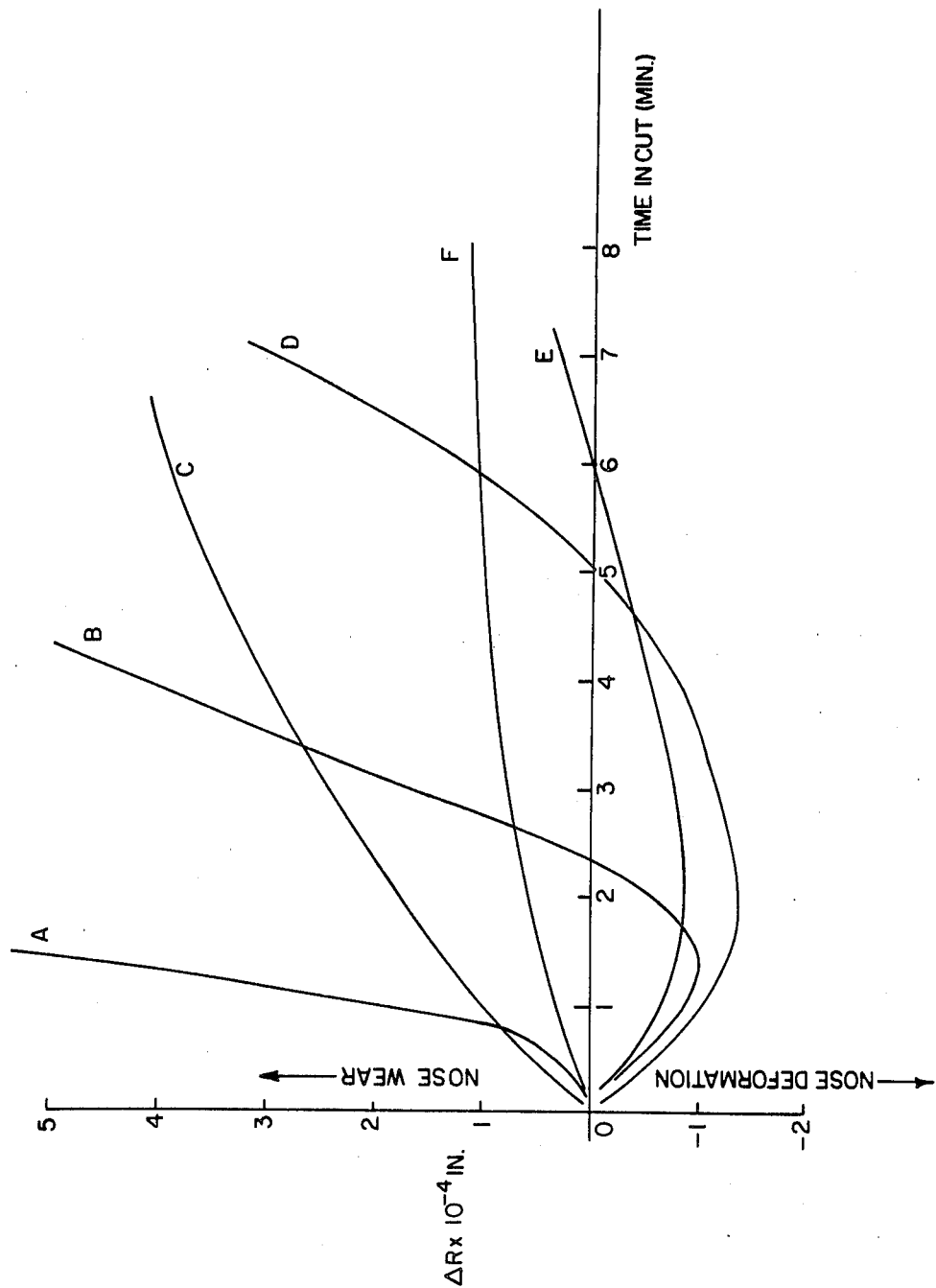

CARBONITRIDE COATED COMPOSITE SILICON NITRIDE CUTTING TOOLS

CROSS-REFERENCE TO RELATED APPLICATIONS

This application contains subject matter related to matter disclosed and claimed in copending patent application, Ser. No. 128,070 filed Mar. 7, 1980 entitled "Abrasion Resistant Silicon Nitride Based Articles" and in the following copending applications filed concurrently herewith, all assigned to the assignee of the present application:

Application Ser. No. 380,364 entitled "Composite Ceramic Cutting Tool";

Application Ser. No. 380,361 entitled "Process for Making a Modified Silicon Aluminum Oxynitride Based Composite Cutting Tool";

Application Ser. No. 380,384, entitled "Carbide Coated Silicon Nitride Cutting Tools";

Application Ser. No. 380,363, entitled "Alumina Coated Silicon Nitride Cutting Tools";

Application Ser. No. 380,381, entitled "Carbonitride Coated Silicon Nitride Cutting Tools";

Application Ser. No. 380,383, entitled "Nitride Coated Silicon Nitride Cutting Tools";

Application Ser. No. 380,362, entitled "Carbide Coated Composite Silicon Nitride Cutting Tools";

Application Ser. No. 380,379, entitled "Alumina Coated Composite Silicon Nitride Cutting Tools";

Application Ser. No. 380,380, entitled "Nitride Coated Composite Silicon Nitride Cutting Tools";

Application Ser. No. 380,387, entitled "Carbide Coated Composite Modified Silicon Aluminum Oxynitride Cutting Tools";

Application Ser. No. 380,388, entitled "Alumina Coated Composite Modified Silicon Aluminum Oxynitride Cutting Tools";

Application Ser. No. 380,389, entitled "Carbonitride Coated Composite Modified Silicon Aluminum Oxynitride Cutting Tools";

Application Ser. No. 380,452, entitled "Nitride Coated Composite Modified Silicon Aluminum Oxynitride Cutting Tools".

FIELD OF THE INVENTION

This invention relates to cutting tools and cutting tool inserts. More particularly, it is concerned with composite silicon nitride ceramic cutting tools and tool inserts having one or more thin adherent coating layers of a refractory carbonitride.

BACKGROUND OF THE INVENTION

Cemented carbide materials are well known for their unique combination of properties of hardness, strength, and wear resistance and have accordingly found extensive use in mining tool bits, metal cutting and boring tools, metal drawing dies, wear resistant machine parts and the like. It is known that the wear resistance of cemented carbide materials may be enhanced by the application of thin coatings of a highly wear resistant material such as titanium carbide or aluminum oxide. These coated carbide materials are finding increasing commercial utility for certain cutting tool and machining applications.

Economic pressures for higher productivity in machining applications are placing increasing demands upon the performance of cutting tool materials. To achieve high productivity in machining, a tool must be able to cut at high speeds. At cutting speeds exceeding 1500 surface feet per minute (sfpm), the high temperature strength and chemical inertness of a cutting tool material become more and more important. The usefulness of cemented carbide cutting tool materials (the predominant material used in cutting tools today) has been extended to applications requiring cutting speeds of about 1500 sfpm by coating such tools with aluminum oxide. For cutting speeds in excess of 1500 sfpm, cemented carbide tools encounter problems associated with loss of strength and tool nose deformation, which affect dimensional tolerance in the workpiece and contribute to shorter tool life.

Conventional ceramic cutting tools overcome many of these disadvantages but have some limitations relating to their lower impact strength and fracture toughness. This is especially true of many alumina-based conventional ceramic cutting tools. Silicon nitride-based ceramic cutting tools have significantly higher impact strength and fracture toughness, but can exhibit lower than desired chemical inertness when employed in cutting long-chipping metals such as steel.

OBJECTS OF THE INVENTION

It is therefore an object of the present invention to provide improved cutting tools and cutting tool inserts.

It is another object of this invention to provide improved cutting tool inserts useful in the machining of metals under demanding conditions of machining speed, temperature, or workpiece hardness.

It is another object of the present invention to provide an improved abrasion resistant composite ceramic cutting tool with improved performance in cutting long-chipping workpiece materials.

SUMMARY OF THE INVENTION

These and other objects, advantages and capabilities are achieved in accordance with the present invention wherein a coated cutting tool or cutting tool insert comprises a composite silicon nitride substrate body having at least one adherent coating of a material selected from the refractory metal carbonitrides. More particularly, the substrate consists essentially of particles of a refractory material uniformly distributed in a matrix. The matrix consists essentially of a first phase of silicon nitride and a refractory second phase comprising silicon nitride and an effective amount of a densification aid selected from the group consisting of yttrium oxide, magnesium oxide, zirconium oxide, hafnium oxide, the lanthanide rare earth oxides, and mixtures thereof.

BRIEF DESCRIPTION OF THE DRAWING

The sole drawing FIGURE is a graph illustrating the resistance to wear of materials in accordance with the present invention compared with prior art materials employed in the machining of steel.

For a better understanding of the present invention together with other and further objects, advantages and capabilities thereof, reference is made to the following disclosure and appended claims in connection with the above-described drawing FIGURE.

DETAILED DESCRIPTION

Cutting tools and tool inserts according to the present invention comprise a composite silicon nitride substrate comprising finely divided particles of a hard refractory material uniformly distributed in a densified silicon nitride matrix. By the term hard refractory material, as used throughout this specification and the appended claims, is meant any carbide and/or nitride and/or carbonitride of a refractory metal, including mixtures and solid solutions thereof. Particular hard refractory materials contemplated as falling within the scope of this invention are materials selected from the foregoing which have a microhardness greater than about 1000 kg/mm$^2$ and a fusion or decomposition temperature greater than about 1500° C. Typical hard refractory materials are the carbides and/or nitrides and/or carbonitrides of titanium, vanadium, chromium, zirconium, niobium, molybdenum, hafnium, tantalum and tungsten, including combinations and solid solutions thereof. The most preferred hard refractory particulates are titanium carbide, titanium nitride, titanium carbonitride, hafnium carbide and hafnium nitride. The particles of the hard refractory material are uniformly distributed in a matrix consisting essentially of a first phase of silicon nitride and a refractory second phase comprising silicon nitride and an effective amount of a densification aid selected from the group consisting of yttrium oxide, zirconium oxide, hafnium oxide, the lanthanide rare earth oxides, and mixtures thereof.

The average particle size of the hard refractory particulate preferably ranges between about 0.5 micron to about 20 microns, more preferably from about 0.5 microns to about 5 microns.

The useful life and performance of cutting tools and tool inserts in accordance with this invention depend to a large measure on the volume fraction taken up by the particulate hard refractory material of the total composite. It has been found that the hardness of the cutting tool substrate body generally increases with increasing volume percent content of the particulate hard refractory material up to about 60 volume percent, but in order to obtain highest hardness and fracture toughness, it is preferred that the carbide and/or nitride and/or carbonitride particulate contained in the substrate body ranges between about 15 to about 50 volume percent, most preferably from about 20 to about 40 volume percent.

The substrate body of coated composite silicon nitride cutting tools and tool inserts in accordance with this invention possesses a composite microstructure in which the hard refractory particulate is distributed throughout a host matrix. The matrix consists essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof.

Because the intergranular phase is essentially continuous, and because impurities and additives present in the overall composite substrate body tend to concentrate in the intergranular phase during the densifying process, the composition of the interganular phase profoundly affects the high temperature properties of the densified composite.

It is considered important to incorporate into this intergranular phase of the host matrix a densification aid which permits densification to densities approaching theoretical, and at the same time does not deleteriously affect the high temperature strength and creep resistance of the overall composite. Typical densification aids useful for this purpose are metal oxides selected from magnesium oxide, yttrium oxide, zirconium oxide, hafnium oxide, the lanthanide rare earth oxides, and mixtures thereof. Yttrium oxide and hafnium oxide are preferred. The metal oxide densification aid is employed in amounts from a lower effective amount which permits full densification to an upper amount which does not unduly affect the high temperature properties of the body. Preferably the metal oxide densification aid comprises from about 1 weight percent to about 25 weight percent of the two phase host matrix in which the hard refractory particulate is dispersed. More preferably, the metal oxide comprises from about 1 weight percent to about 5 weight percent of the host matrix.

Silicon dioxide is added to the initial powder mixture employed in the formation of the substrate body or alternatively, is present as a surface oxide coating on the silicon nitride employed. During subsequent processing of the powder mixture to form the densified composite silicon nitride substrate body, the silicon dioxide and metal oxide densification aid tend to concentrate in the intergranular phase. It is preferred that the amount of silicon dioxide present in the final densified body comprise less than about 5 weight percent of the host matrix.

The intergranular phase of the substrate host matrix may contain further additional materials in the form of additives or impurities in addition to the above-mentioned silicon dioxide and metal oxide densification aids. Such further additional materials are preferably present in amounts less than about 5 weight percent of the host matrix.

In accordance with the principles of the present invention, the substrate body is coated with at least one hard, adherent coating layer comprising a refractory metal carbonitride. Typical metal carbonitrides include the carbonitrides, of titanium, vanadium, chromium, zirconium, niobium, molybdenum, hafnium, tantalum, and tungsten. Preferred coatings in accordance with this invention are titanium carbonitride and hafnium carbonitride.

The coating layer is of a thickness ranging between about 0.1 microns to about 20 microns, preferably between about 1.0 and about 10 microns. Exemplary methods of making coated cutting tools and tool inserts in accordance with this invention are given below. The methods are to be viewed as illustrative and are not to be viewed as limiting the scope of the invention as defined by the appended claims. Methods I and II below illustrate methods of preparing the substrate body of cutting tools and tool inserts of this invention. In one method, pressed green compacts containing silicon nitride, a hard particulate refractory material, silicon dioxide, and one or more metal oxides serving as densification aids are sintered to a dense body. In the other method, dry powder mixtures of the above materials are hot pressed to produce a shaped cutting tool insert.

Method I

To one part by weight of a powder mixture of silicon nitride, a hard refractory material, and metal oxide densification aid are added about 2.5 parts by weight of toluene, 0.1 parts by weight of methanol, and about 0.05 parts by weight of stearic acid. The resulting slurry is thoroughly mixed by ball milling and then dried at 75° C. The resulting dry mixture is ball milled for about 24 hours and then mixed with about 0.05 parts by weight of a copolymer of polyethylene glycol and methoxypolyethylene glycol, 1 part by weight toluene, and about 0.05 parts by weight methanol. This mixture is mixed by ball milling for about 15 minutes, dried at 75°

C. and then screened through a 60 mesh screen. The −60 mesh fraction is pressed at ambient temperatures at a pressure of about 25,000 psig to obtain a green compact. The residual solvents and stearic acid binder are moved from the green compact by heating at about 600° C. in an inert atmosphere. The green compact is then sintered to a hard, highly densified composite body by heating at a temperature of between about 1700° C. to about 1850° C.

Method II

The procedure of Method I is followed to the point of obtaining the −60 mesh dry powder mixture. This material is then pressed at a pressure of about 3000 psig and a temperature of about 1700° C. to produce a hard, highly densified composite body.

Coating Methods

The composite substrate body produced by either Method I or Method II is coated with a refractory metal carbonitride by chemical vapor deposition techniques or physical vapor deposition techniques known in the art. For example, the preferred coatings of titanium carbonitride or hafnium carbonitride are applied by chemical vapor deposition. Alternatively, the refractory metal is deposited by chemical or physical vapor deposition techniques after which the metal layer is nitrided and carburized.

As an example, titanium carbonitride layers are formed on the composite silicon nitride substrates of cutting tools of this invention in the chemical vapor deposition technique by passing a gaseous mixture of titanium tetrachloride, a gaseous carbon source such as methane, a gaseous nitrogen source such as nitrogen or ammonia, and hydrogen over the substrate at a temperature of between about 800° C. and 1500° C., preferably at temperatures above about 1200° C. Dissociated ammonia may be substituted for a mixture of nitrogen and hydrogen gases. The reaction is described by the following equation, although hydrogen is often added to insure that the reaction takes place in a reducing environment:

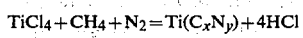

$$TiCl_4 + CH_4 + N_2 = Ti(C_xN_y) + 4HCl$$

The mixture is passed over the heated substrate until the desired coating thickness is achieved. Routine experimentation is used to determines the rate of coating thickness growth at a particular gaseous flow rate and temperature.

Control of the amounts of methane and nitrogen in the gas mixture permit the formation of layers in which the ratio of x to y in the formula $Ti(C_xN_y)$ are varied. The values of x and y preferably range between about 0.5 to about 0.6 for x and from about 0.4 to about 0.5 for y resulting in a preferred range of x/y ratio of from about 1.0 to about 1.5. The most preferred ratio of x to y is about 1.22, corresponding to values for x and y of about 0.55 and about 0.45, respectively.

The following examples provides details for the preparation of titanium carbonitride coated composite silicon nitride substrate cutting tool inserts in accordance with the present invention. In these particular example, the composite substrate contains particulate titanium carbide uniformly distributed in the substrate matrix.

EXAMPLE 1

Several composite silicon nitride substrate bodies containing about 30 volume percent titanium carbide were placed in a reactor and heated to a temperature of about 1060° C. A gaseous mixture of about 1% $TiCl_4$, 3.5% $CH_4$, 2.5% $N_2$, and 93% $H_2$ was passed over the bodies at atmospheric pressure and at a flow rate of about 20 liters/minute for a period of about 2 hours. At the end of this time, the titanium carbonitride coated bodies were removed from the reactor, and the coating thickness was determined to be about 8 microns by scanning electron microscopic techniques. An analysis of the composition of the coating indicated that it had a C/N ratio of about 1.1.

EXAMPLE 2

Several composite silicon nitride substrate bodies containing about 30 volume percent titanium carbide were coated under essentially the same conditions as in example 1, however at a pressure of about 50 Torr. The gaseous mixture composite was about 0.5% $TiCl_4$, 1.5% $CH_4$, 2% $N_2$, and 96% $H_2$. After 2 hours of coating at about 1060° C., the bodies had a coating of less than 10 microns thickness, having a C/N ratio of about 1.1.

Referring to the sole drawing FIGURE, there are shown the wear resistance characteristics of the cutting tool made in accordance with the above-described example compared with the wear resistance characteristics of several other tools. The data plotted in the FIGURE were obtained by machining a piece of 4340 steel (Brinnell hardness number 280-300) with each tool insert material under identical conditions and measuring the rate of wear of the tool piece as indicated by a change in workpiece radius (delta R).

The machining speed was 700 surface feet per minute (21336 surface centimeters per minute), the cut was 0.050 inches (0.13 cm) deep, and the rate of cross-feed was 0.01 inches per revolution (0.0254 centimeters per revolution). The curves depict tool nose wear versus duration of cutting time. The ordinate of the graph is plotted in units of apparent change in the radius of the rotating workpiece, used as an indicator of tool nose wear. As the tool cuts across the workpiece face, the radius of the workpiece should theoretically remain at a constant value equivalent to the old radius less the depth of the cut being made. This condition corresponds to the abscissa of the graph. Positive values of delta R corresponds to wear in the cutting tool nose which results in an apparent decrease in the radius of the cut workpiece. Correspondingly, negative values of delta R represent deformation of the tool nose.

Curves B, D, and E represent prior art coated cemented carbide cutting tools. Curve D corresponds to a titanium carbide coated cemented carbide tool, while curves B and E represents data for alumina coated cemented carbide tools. In all three cases, the curves dip below the abscissa, indicating tool nose deformation. As discussed above, this is due to the tendency of cemented carbide tools to soften under certain machining conditions.

Curves A, C, and F represent data for the machinability of ceramic cutting tools. Curve A corresponds to the wear performance of an uncoated composite silicon nitride cutting tool containing titanium carbide uniformly distributed in a two phase silicon nitride matrix. This tool in fact corresponds to the substrate of coated tools made in accordance with the teachings of the present invention.

Curve C represents data for a prior art titanium carbide-containing composite alumina cutting tool, and curve F corresponds to a cutting tool in accordance with the present invention.

The titanium carbonitride coated composite silicon nitride cutting tool of the present invention (Curve F) is superior in wear resistance to all the tools for which data is shown.

Thus, the present invention provides cutting tools comprising a composite silicon nitride substrate coated with a refractory metal carbonitride which have improved machinability and wear resistance to known prior art tools.

While there have been shown and described what are at present believe to be the preferred embodiments of the invention, it will be obvious to one skilled in the art that various modifications may be made therein without departing from the scope of the invention as defined by the appended claims.

What is claimed is:

1. A coated composite ceramic cutting tool comprising a composite silicon nitride substrate body having at least one adherent coating layer; said substrate body consisting essentially of particles of a refractory material uniformly distributed in a matrix consisting essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof; said adherent coating layer consisting essentially of a material selected from the refractory metal carbonitrides.

2. A coated composite ceramic cutting tool in accordance with claim 1 wherein said refractory metal carbonitride coating is selected from the group consisting of titanium carbonitride, vanadium carbonitride, chromium carbonitride, zirconium carbonitride, niobium carbonitride, molybdenum carbonitride, hafnium carbonitride, tantalum carbonitride, and tungsten carbonitride.

3. A coated composite ceramic cutting tool in accordance with claim 2 wherein said refractory metal carbonitride coating is titanium carbonitride or hafnium carbonitride.

4. A coated composite ceramic cutting tool in accordance with claim 2 wherein the carbon to nitrogen ratio in said refractory metal carbonitride coating ranges between about 1.0 and 1.5.

5. A coated composite ceramic cutting tool in accordance with claim 1 wherein said coating layer is of a thickness between about 0.1 microns and 10 microns.

6. A coated composite ceramic cutting tool in accordance with claim 5 wherein said coating layer is of a thickness between about 1.0 and about 10 microns.

7. A coated composite ceramic cutting tool in accordance with claim 1 wherein said hard refractory material is selected from the carbides, nitrides, carbonitrides and solid solutions thereof of titanium, vanadium, chromium, zirconium, niobium, molybdenum, hafnium, tantalum, and tungsten and mixtures thereof.

8. A coated composite ceramic cutting tool in accordance with claim 7 wherein said hard refractory material is selected from the group consisting of titanium carbide, titanium nitride, titanium carbonitride, hafnium carbide, hafnium nitride, and hafnium carbonitride.

9. A coated composite ceramic cutting tool in accordance with claim 7 wherein the average particle size of said hard refractory material is between about 0.5 microns to about 20 microns.

10. A coated composite ceramic cutting tool in accordance with claim 9 wherein the average particle size of said hard refractory material is less than about 5 microns.

11. A coated composite ceramic cutting tool in accordance with claim 1 wherein said hard refractory material is present in said substrate in an amount of up to about 60 volume percent.

12. A coated composite ceramic cutting tool insert in accordance with claim 11 wherein said hard refractory material is present in said substrate in an amount of between about 15 volume percent of about 50 volume percent.

13. A coated composite ceramic cutting tool in accordance with claim 12 wherein said hard refractory material is present in said substrate in an amount of between about 20 volume percent and about 40 volume percent.

14. A coated composite ceramic cutting tool in accordance with claim 1 wherein said metal oxide densification aid is yttrium oxide or hafnium oxide.

15. A coated composite ceramic cutting tool in accordance with claim 1 wherein said metal oxide is present in an amount of between about 1 weight percent to about 25 weight percent of said two phase matrix.

16. A coated composite ceramic cutting tool in accordance with claim 1 wherein silicon dioxide is present in an amount less than five weight percent of the matrix.

* * * * *